(12) United States Patent
Yatagai et al.

(10) Patent No.: US 7,134,520 B2
(45) Date of Patent: Nov. 14, 2006

(54) ENGINE STRUCTURE OF SNOWMOBILE

(75) Inventors: Yasuaki Yatagai, Hamamatsu (JP); Takashi Nishihara, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 281 days.

(21) Appl. No.: 10/808,420

(22) Filed: Mar. 25, 2004

(65) Prior Publication Data

US 2004/0188161 A1 Sep. 30, 2004

(30) Foreign Application Priority Data

Mar. 26, 2003 (JP) ............................. 2003-086137
Mar. 26, 2003 (JP) ............................. 2003-086138

(51) Int. Cl.
*B62M 27/02* (2006.01)

(52) U.S. Cl. ..................................... 180/190; 180/68.3

(58) Field of Classification Search ................ 180/190, 180/68.3; 123/559.1; 60/598
See application file for complete search history.

(56) References Cited

U.S. PATENT DOCUMENTS

| 4,559,783 | A | * | 12/1985 | Ampferer | 60/605.1 |
| 5,598,065 | A | * | 1/1997 | Lakosky | 315/77 |
| 6,508,211 | B1 | * | 1/2003 | Asano | 123/41.1 |
| 6,745,862 | B1 | * | 6/2004 | Morii et al. | 180/296 |
| 6,802,383 | B1 | * | 10/2004 | Nishijima | 180/190 |
| 2002/0084125 | A1 | * | 7/2002 | Scheumacher et al. | 180/190 |

* cited by examiner

*Primary Examiner*—Tony Winner
(74) *Attorney, Agent, or Firm*—Oblon, Spivak, McClelland, Maier & Neustadt, P.C.

(57) ABSTRACT

In a snowmobile, an upper front half of a vehicle body of the snowmobile is covered to be openable by an engine hood in which an engine room is defined, an engine is disposed in the engine room, and a turbo-charger is mounted on the engine. In an engine structure of such snowmobile, a headlight is disposed above a rear portion of the engine hood, and the engine is arranged in a state inclined rearward downward so that a cylinder head of the engine is disposed below the headlight in a side view and the turbo-charger is arranged below the cylinder head.

12 Claims, 9 Drawing Sheets

ENGINE STRUCTURE OF SNOWMOBILE

BACKGROUND OF THE INVENTION

1. Field of the Invention

The present invention relates to an engine structure of a snowmobile.

2. Related Art

Snowmobiles have been mainly equipped with two-stroke-cycle engines because of requirements of their light weight and high power. However, in view of environmental matters, there is a recent tendency or requirement for a snowmobile to be mounted with a four-stroke-cycle engine.

The four-stroke-cycle engine, such as shown in Japanese Patent Laid-open Publication No. 2001-214750, has an overall height higher than that of the two-stroke-cycle engine and is equipped with a turbo-charger and an inter-cooler so as to have the same power even with the same size as the two-stroke-cycle engine.

However, an engine room of the snowmobile is located at a position in front of a steering bar covered with an engine hood, and the engine hood has a shape inclined forward downward with the highest position being disposed at the lowermost position of a headlight so as not to intercept an optical axis of the headlight. Thus, according to such arrangement, it is difficult to lay out the four-stroke-cycle engine and auxiliary machinery such as turbo-charger in the snowmobile.

Furthermore, inside the engine hood, ambient air temperature is increased by heat generated through the engine operation and the intake air temperature is also increased, which will result in the lowering of an output efficiency of the engine, as well as generating an adverse affect on the equipment or elements disposed inside the engine.

SUMMARY OF THE INVENTION

The present invention has been made in view of the circumstances in the prior art described above, and it is an object of the present invention to provide a compact engine structure of a snowmobile.

This and other objects of the present invention can be achieved according to the present invention by providing an engine structure of a snowmobile, in which an upper front half of a vehicle body of the snowmobile is covered by an engine hood so as to be openable and form an engine room therein wherein an engine is disposed in the engine room, the engine having a turbo-charger mounted thereon, wherein a headlight is disposed above a rear portion of the engine hood, and the engine is arranged in a state inclined rearward downward so that a cylinder head of the engine is disposed below the headlight in a side view and the turbo-charger is arranged below the cylinder head.

In a preferred embodiment of the above aspect, it is preferred that the engine is arranged so as to be offset in one direction in a plan view and an inter-cooler is disposed on a side opposite the side on which the engine is offset.

The inter-cooler may be attached to a mount bracket with a cushion being interposed therebetween in a state inclined forward downward, and the mount bracket is attached to a boss formed an the engine. It is also preferred that the inter-cooler is mounted to the mount bracket through bolts disposed to the mount bracket substantially perpendicularly in an upward direction.

An oil filter for filtering lubricating oil of the engine may be disposed so as to be detachably at a front lower portion of the engine and below the turbo-charger in a forward tilting state. A water-cooling oil cooler for cooling the lubricating oil may be further disposed in an affixing base of the oil filter in series of the oil filter. A cooling water passage for cooling the turbo-charger and a cooling water passage of the oil cooler are communicated with each other through a cooling water tube.

Furthermore, it may be preferred that a skid for steering operation is disposed in a front lower portion of the vehicle body so as to be supported by a front suspension mechanism in a shock-absorbable manner, and an air box for introducing an outside air is arranged in front of the turbo-charger and the suspension mechanism.

A meter panel may be further disposed behind the headlight and an intake manifold is arranged behind the cylinder head and in a space between the meter panel and the headlight. In this arrangement, an equipment box, in which electronic equipment for controlling engine operation are disposed, may be disposed in a rear portion of the intake manifold.

The turbo-charger may be provided with an exhaust port from which an exhaust pipe extends and a muffler is connected to a downstream side end of the exhaust pipe so as to be located below the inner-cooler.

A battery may be further disposed behind the inner-cooler.

According to the present invention of the structures and equipment mentioned above, the engine can be made compact and be capable of being mounted in the engine room below the engine hood which has a shape inclined forward downward.

Furthermore, the inter-cooler is not affected by the deformation of the vehicle body and no load or stress is generated on a portion connected to the engine, and hence, the pipe between the engine and the intercooler is shortened and also made compact. In addition, the vibration of the engine is hardly transmitted to the inter-cooler. Maintenance efficiency such as detachability can be also improved.

Still furthermore, the maintenance efficiency such as the detachability of the oil filter can be improved and the length of the cooling pipe can be decreased, thereby making compact the entire structure of the snowmobile engine and improving the maintenance efficiency and the performance for cooling the lubricating oil in the engine structure.

Still furthermore, the electronic equipments can be protected from heat from the elements inside the engine, and in addition, the arrangement of the harness between the electronic equipment and the equipment around the engine can be shortened.

The nature and further characteristic features of the present invention will be made more clear from the following descriptions for the structure and function which are made more clearly understood with reference to the accompanying drawings.

DESCRIPTION OF THE PREFERRED EMBODIMENT

One preferred embodiment of the present invention will be described hereunder with reference to the accompanying drawings.

Figure 1:
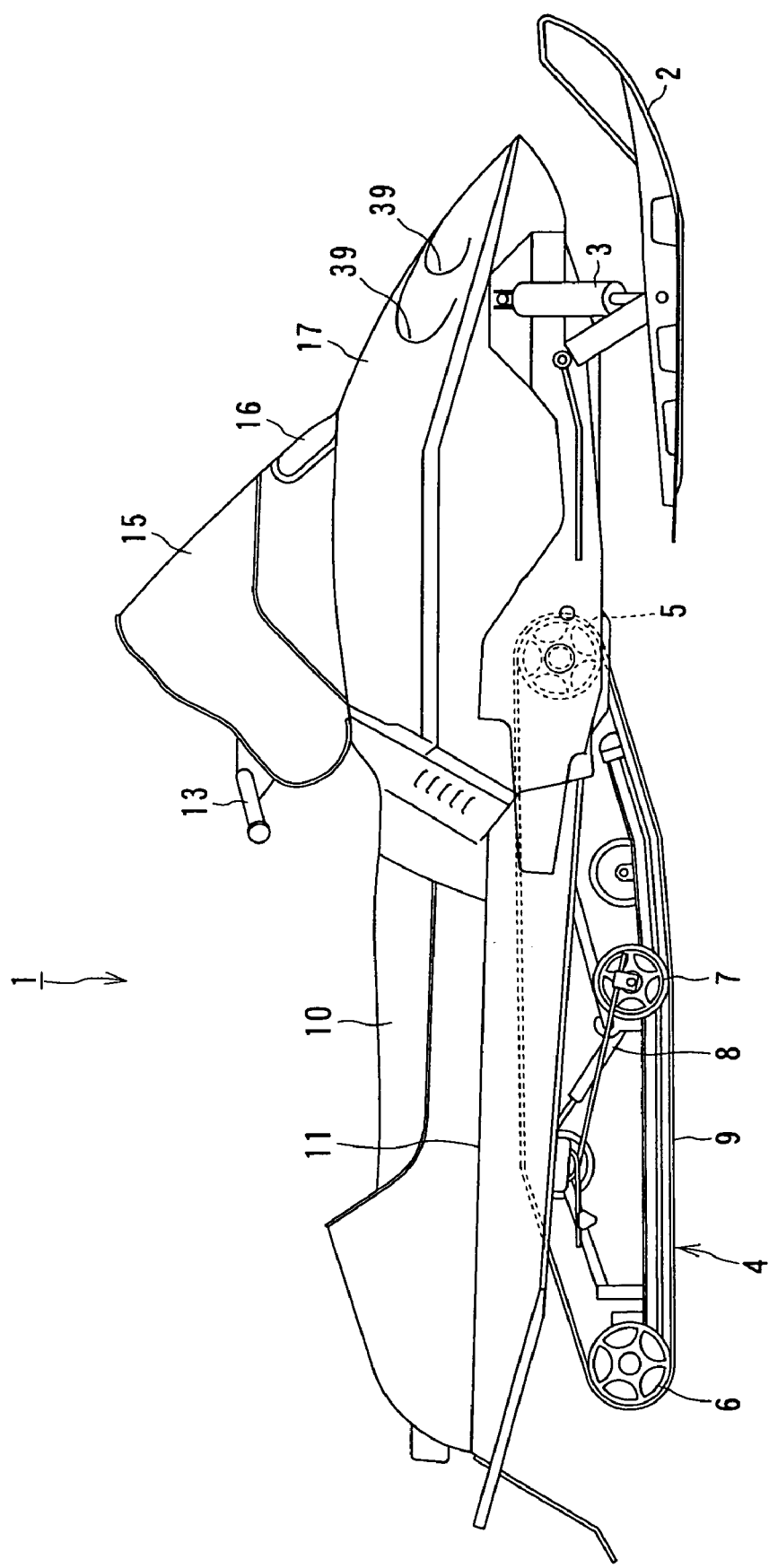
FIG. 1 is a right side view of a snowmobile provided with a compact engine structure according to one embodiment of the present invention.
Figure 2:
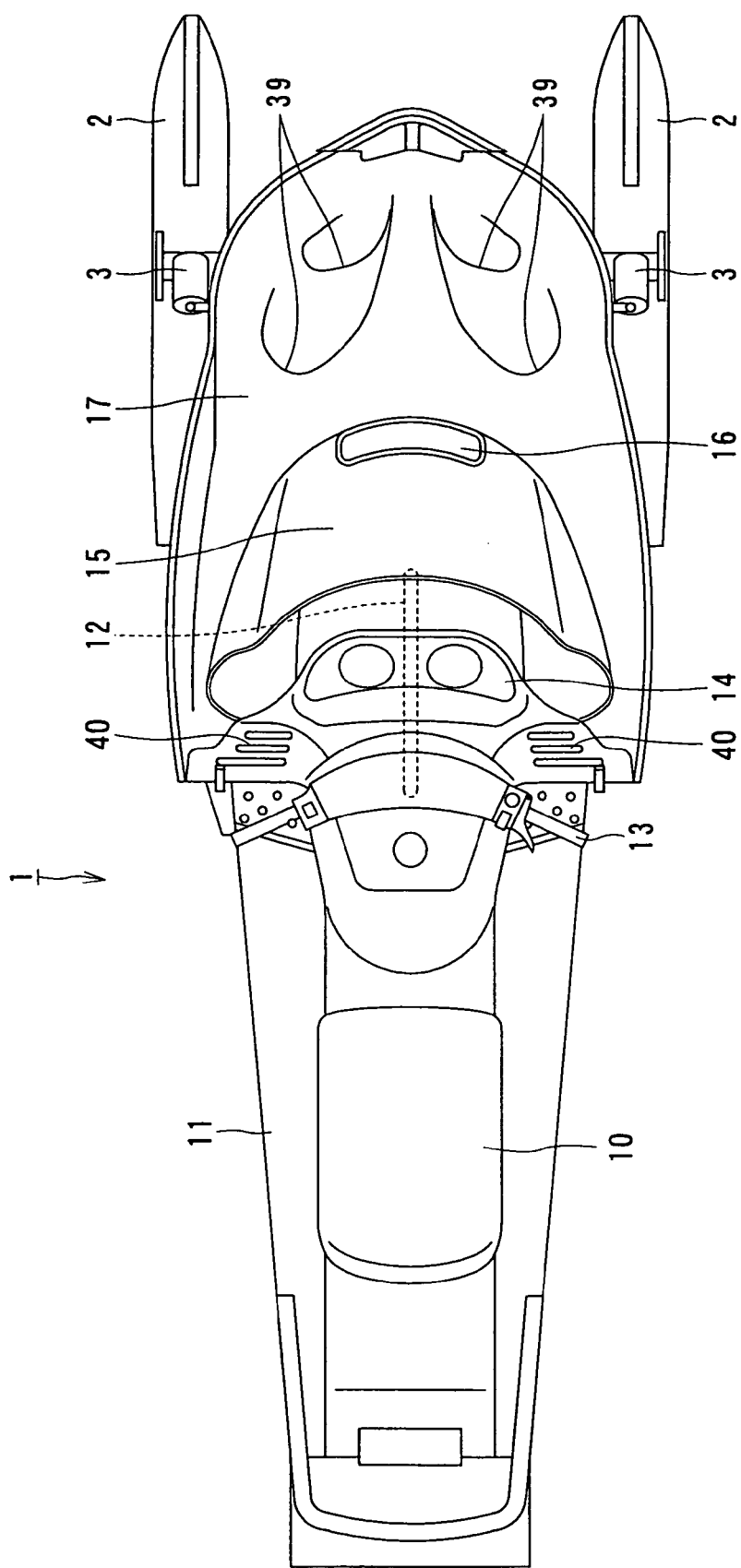
FIG. 2 is a plan view of the snowmobile of FIG. 1.
Figure 3:
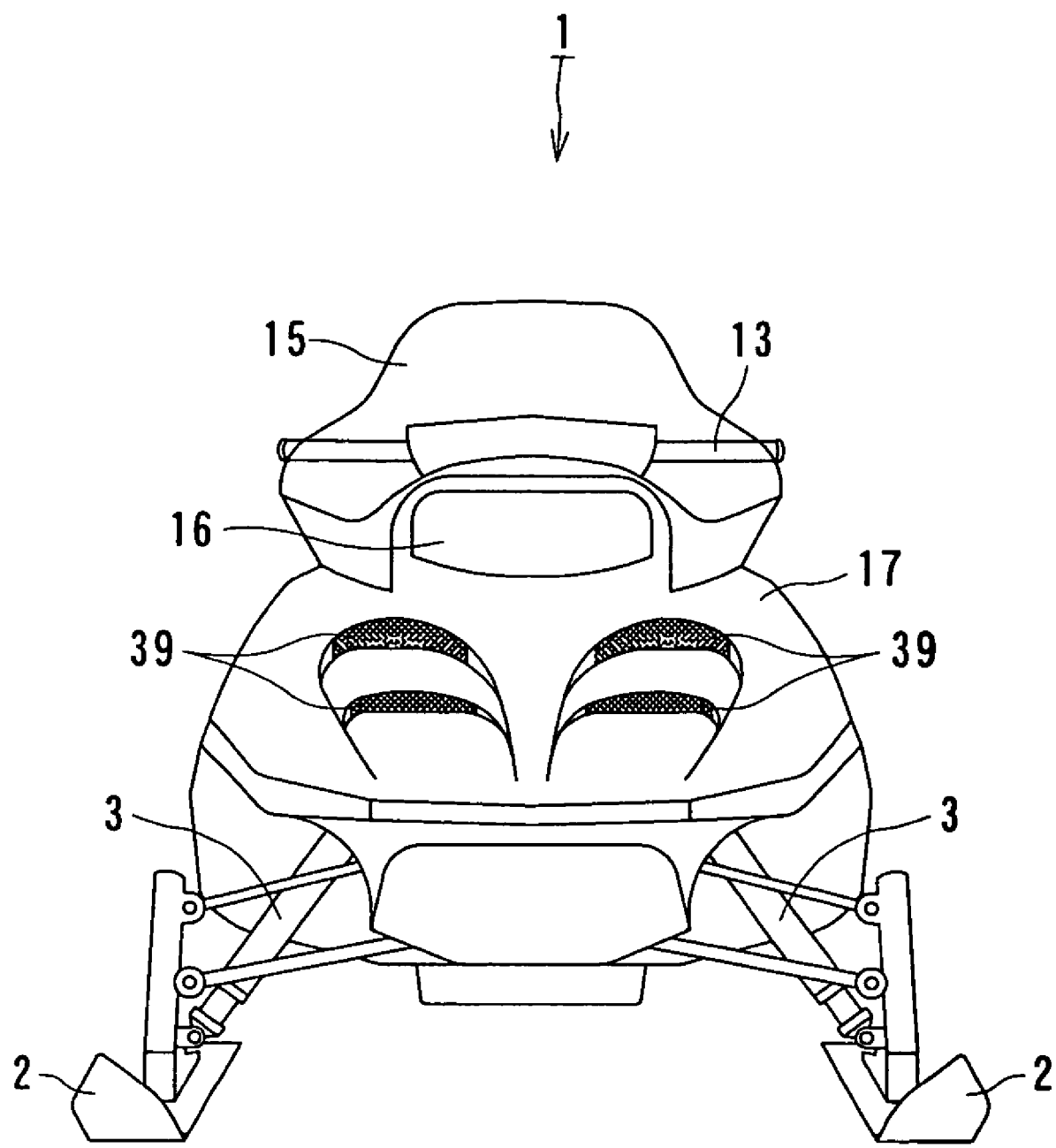
FIG. 3 is a front view of the snowmobile of FIG. 1.

As shown in FIGS. 1 to 3, a snowmobile 1 is provided with a lateral pair of steering skids 2 disposed below the front side of a longitudinally extending vehicle body so as to laterally steer the snowmobile 1. The steering skids 2 are supported by front suspension mechanisms 3 so as to be shock-absorbable.

On the other hand, there is also provided a crawler mechanism 4 arranged below the rear side of the vehicle body. The crawler mechanism 4 includes a driving wheel 5 arranged on the front side, driven wheel 6 arranged on the rear side, a plurality of intermediate wheels 7 arranged between these driving and driven wheels 5 and 6, a rear suspension mechanism 8 for shock-absorbably supporting the intermediate wheels 7, and a crawler 9 stretched between these wheels.

A driver's seat 10 is disposed above the crawler mechanism 4 so as to extend in a longitudinal direction of the vehicle body of the snowmobile 1, and the driver's seat 10 is provided with steps 11 disposed to be lower, by one step, on both sides. In front of the driver's seat 10, a handle bar 13 for operating the steering skids 2 is arranged through a steering shaft 12 disposed therebetween. In front of the handle bar 13, a meter panel 14 and a windshield 15 are arranged. A headlight 16 is also arranged in front of the meter panel 14 and in the lowest portion of the windshield 15.

The front upper half of a vehicle body is covered with an engine hood 17 so as to form an engine room 18 therein, and an engine 19 is mounted therein. The engine hood 17 has a shape inclined forward downward with the highest position being disposed at the front lowermost position of the headlight 16 so as not to intercept an optical axis of the headlight 16.

Figure 4:
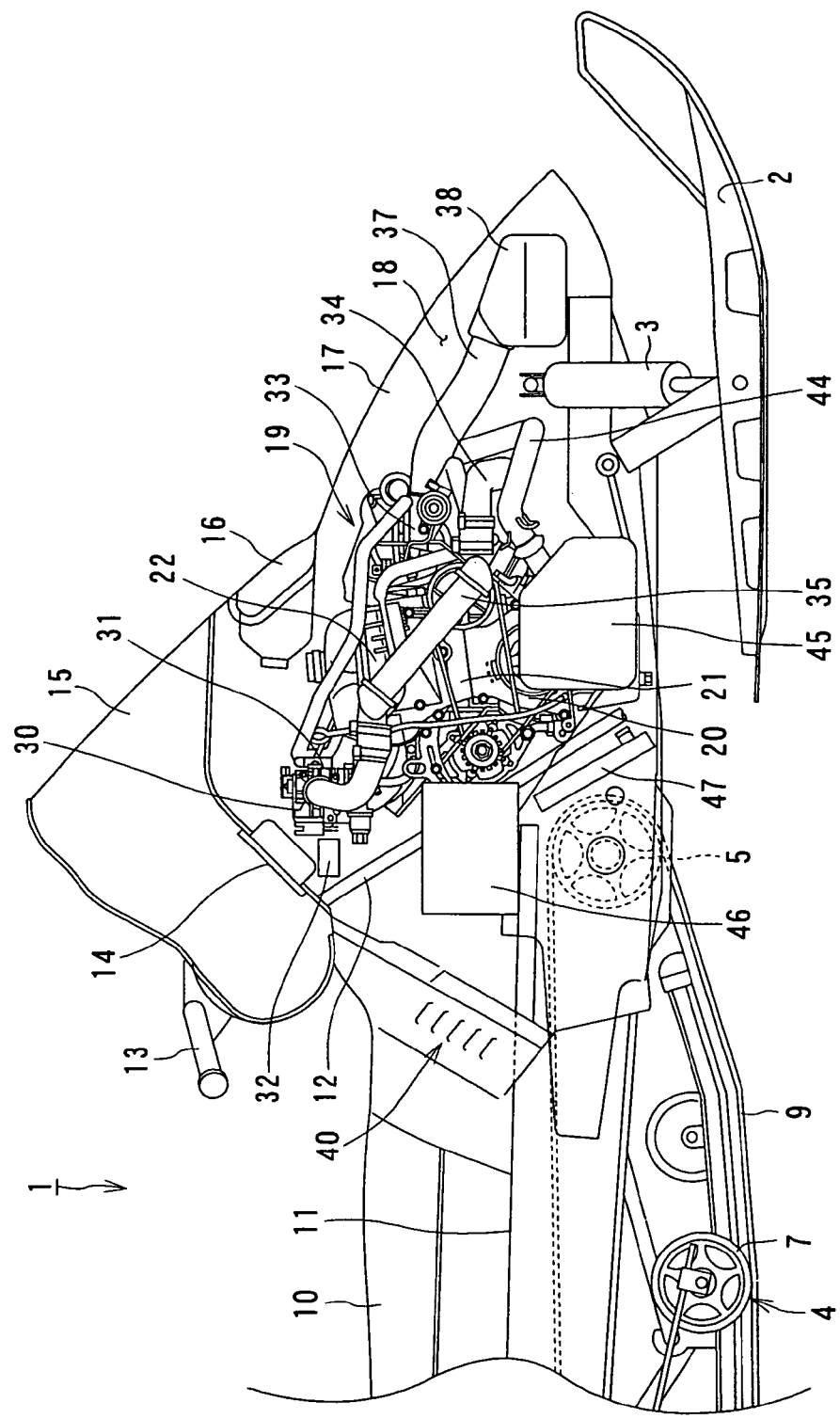
FIG. 4 is a right side view, in an enlarged scale, showing an engine room of the snowboard of FIG. 1.
Figure 5:
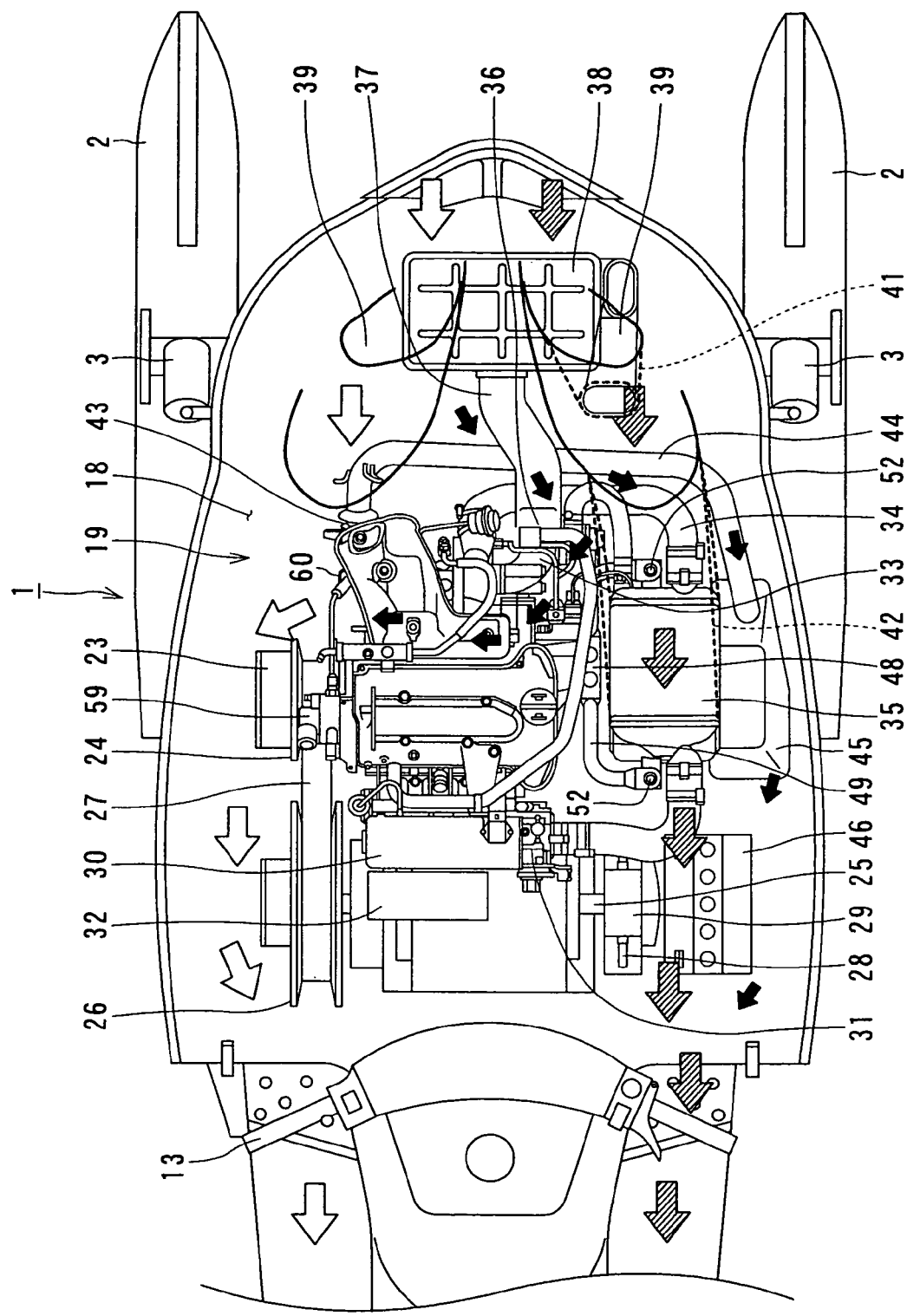
FIG. 5 is a plan view of the engine room of FIG. 4.
Figure 6:
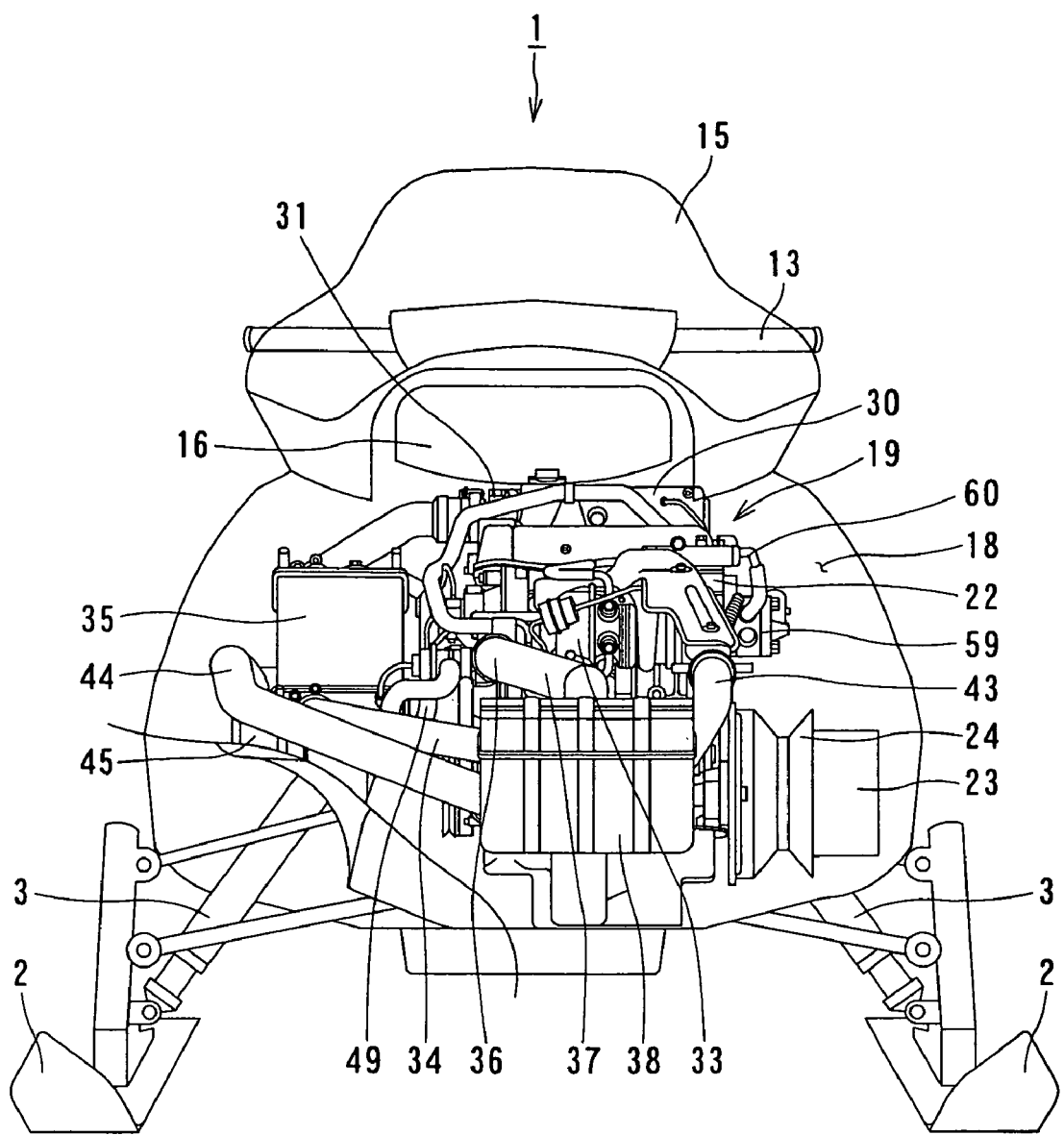
FIG. 6 is a front view of the engine room of FIG. 4.

Then, with reference to FIGS. 4 to 6, the engine 19 is a four-stroke-cycle parallel multi-cylinder engine including a crank case 20, a cylinder block 21 placed above the crank case 20, and a cylinder head 22 disposed above the cylinder block 21, for example.

The engine 19 is transversely arranged so that an axial line of a crank shaft, not shown, rotatably journaled in the crank case 20 extends in the width direction of the vehicle body. The engine 19 is arranged below the headlight 16 in a state slightly inclined about the crank shaft rearward downward so that the cylinder head 22 is disposed below the headlight 16 in a side view. The engine 19 is arranged in a plan view so as to be offset in one direction, on the left in the traveling direction of the vehicle body according to the embodiment.

Within the cylinder block 21, cylinders, not shown, are formed, into which pistons are slidably inserted in the direction perpendicular to the crank shaft. Then, the pistons and the crank shaft are connected by means of a connecting rod, not shown, so that the reciprocating strokes of the pistons are converted into the rotational motion of the crank shaft.

One end of the crank shaft, to which the engine 19 is connected in the offset manner, the left end portion, in the illustrated embodiment, protrudes outside the engine 19, and the protruded portion is provided with a drive pulley 24 having a CVT mechanism (Continuously Variable Transmission or non-stage transmission) 23 arranged rotatably together with the crank shaft. On the other hand, rearward the engine 19, a drive shaft 25, which is a power transmission mechanism, is arranged in parallel with the crank shaft, and a driven pulley 26 is provided at the end (left end) of the drive shaft 25 adjacent to the drive pulley 24. Then, a drive belt 27 is stretched between the drive pulley 24 and the driven pulley 26 so as to transmit the rotation of the crank shaft to the drive shaft 25.

On the other hand, at the other end (right end) of the drive shaft 25, a drive sprocket, not shown, is provided, and a driven sprocket, not shown, is provided coaxially and rotatably together with the drive wheel 5 of the crawler mechanism 4. Furthermore, between the drive sprocket and the driven sprocket, a drive chain, not shown, is stretched around so as to transmit the rotation of the engine 19 to the crawler mechanism 4. The right end of the drive shaft 25 is provided with a brake disk 28 arranged rotatably together with the drive shaft 25 so as to constitute a brake device together with a brake caliper 29 for braking the crawler mechanism 4.

An intake manifold 30 is disposed in a space between the meter panel 14 and the headlight 16 so as to constitute an air-inlet system, and the intake manifold 30 is attached to the rear portion of the cylinder head 22 at the rear portion of the space. A throttle body 31 is for example connected to an upstream side portion of the intake manifold 30, and an ECM (Engine Control Module or Electric Control Module) box 32 containing electronic instruments, not shown, for controlling the engine 19 is also arranged at the rear portion of the intake manifold 30.

On the other hand, a turbo-charger 33 (super charger) is arranged at lower front portion of the cylinder head 22, and from this turbo-charger 33, an intake path 34 extends in a direction opposite to the CVT mechanism 23 with the engine 19 being disposed therebetween, i.e., in a direction opposite to the side, to which the engine 19 is offset, on the right side of the described embodiment, so as to be connected to the throttle body 31. Further, an intercooler 35 is interposed in the intermediate of the intake path 34 located on the right side of the engine 19 for cooling the intake air pressurized and heated by the turbo charger 33.

An air-inlet tube 37 extends, from an inlet 36 of the turbo-charger 33, towards the front portion of the vehicle body, and the upstream side end of the air-inlet tube 37 is connected to an air box 38 arranged in front of the turbo-charger 33 and the front suspension 3.

As shown in FIGS. 1 to 3, a plurality of fresh-air (outside air) inlets 39 for inducing fresh air in the engine room 18 are formed above the air box 38 of the engine hood 17, while, as shown in FIGS. 2 and 5, air outlets 40 for exhausting outward the air in the engine room 18 are formed to the rear portion of the engine room 18. Furthermore, as shown in FIG. 5, on the bottom portion of the engine hood 17, ducts 41 and 42 are provided for forcedly introducing the fresh air in-taken through least one of the fresh-air inlets 39 to the air box 38 and the inter-cooler 35.

On the other hand, an exhaust tube 44 extends from an outlet 43 of the turbo-charger 33 towards the bottom portion of the inter-cooler 35 arranged on the right side of the engine 19, and the downstream side of the exhaust tube 44 is connected to a muffler 45 arranged below the inter-cooler 35 in the illustrated state. Furthermore, a battery 46 is arranged at the rear portion of the inter-cooler 35, and a radiator 47 is arranged, for cooling the engine, at a portion below the battery 46 and to the rear portion of the muffler 45.

Furthermore, as shown in FIGS. 4 and 5, the inter-cooler 35 is attached to a boss 48 integrally formed to the right side surface of the cylinder block 21 with a mount bracket 49 being disposed therebetween.

Figure 7:
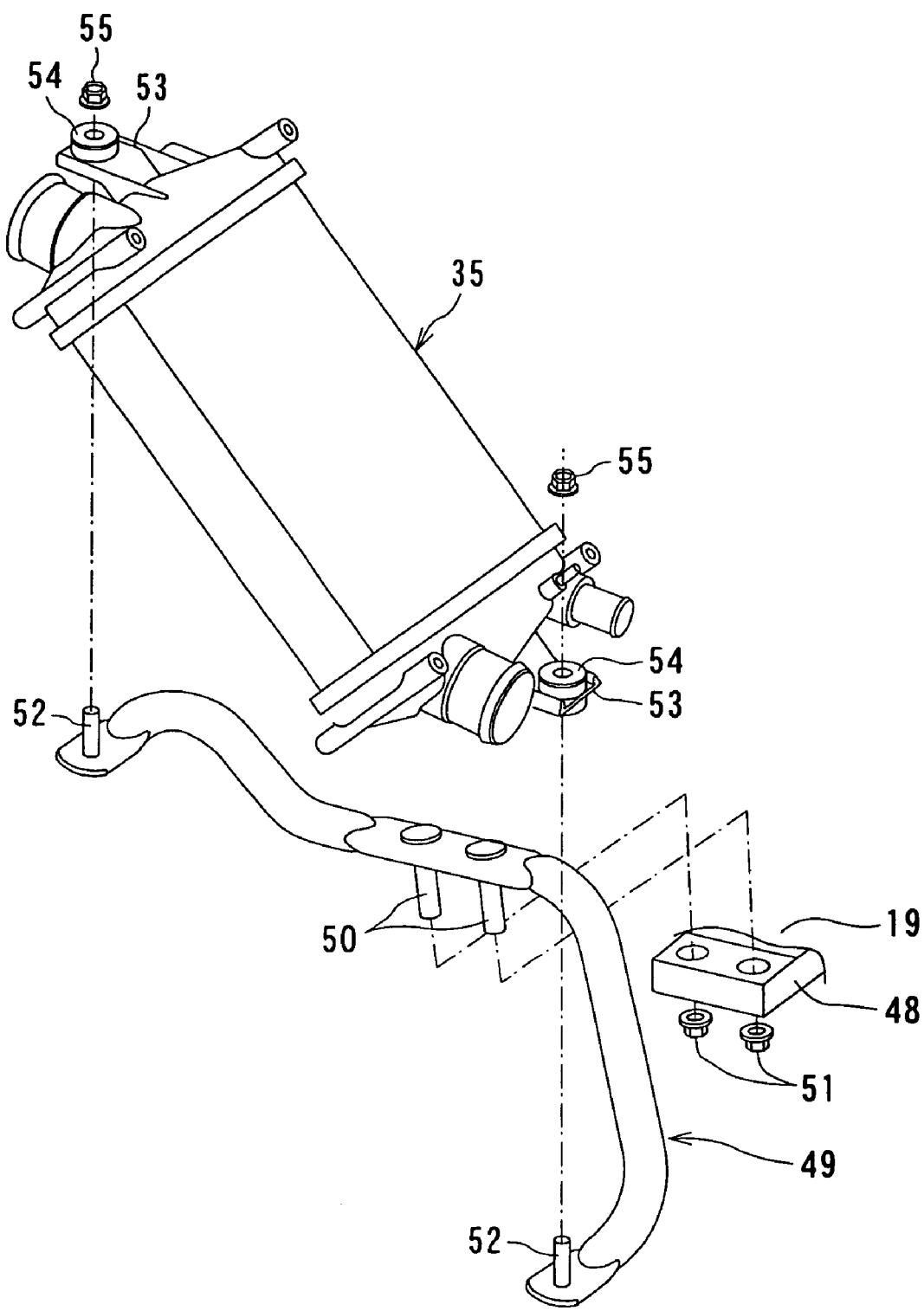
FIG. 7 is a developed perspective view showing a state of mounting an inter-cooler of the engine of the snowboard of FIG. 1.

With reference to FIG. 7 showing the perspective view of the attached state of the intercooler 35, the mount bracket 49 is formed by folding a pipe member and fixed to the boss 48 of the cylinder block 21 by means of bolts 50 and nuts 51 at its substantially intermediate portion. In this state, the mount bracket 49 is adjusted in position so that the rear portion thereof becomes higher than its front portion.

Bolts 52 extends substantially vertically towards the top from the front and rear ends of the mount bracket 49, and stays 53 provided at the upper and lower ends of the intercooler 35 are attached to these bolts 52 from the upper side as viewed in a state that elastic cushion members 54 are disposed therebetween, so that the inter-cooler 35 is fixed to the boss 48 of the engine 19 via the mount bracket 49 in a state inclined forward downward by screwing and fastening nuts 55 to the bolts 52.

Figure 8:
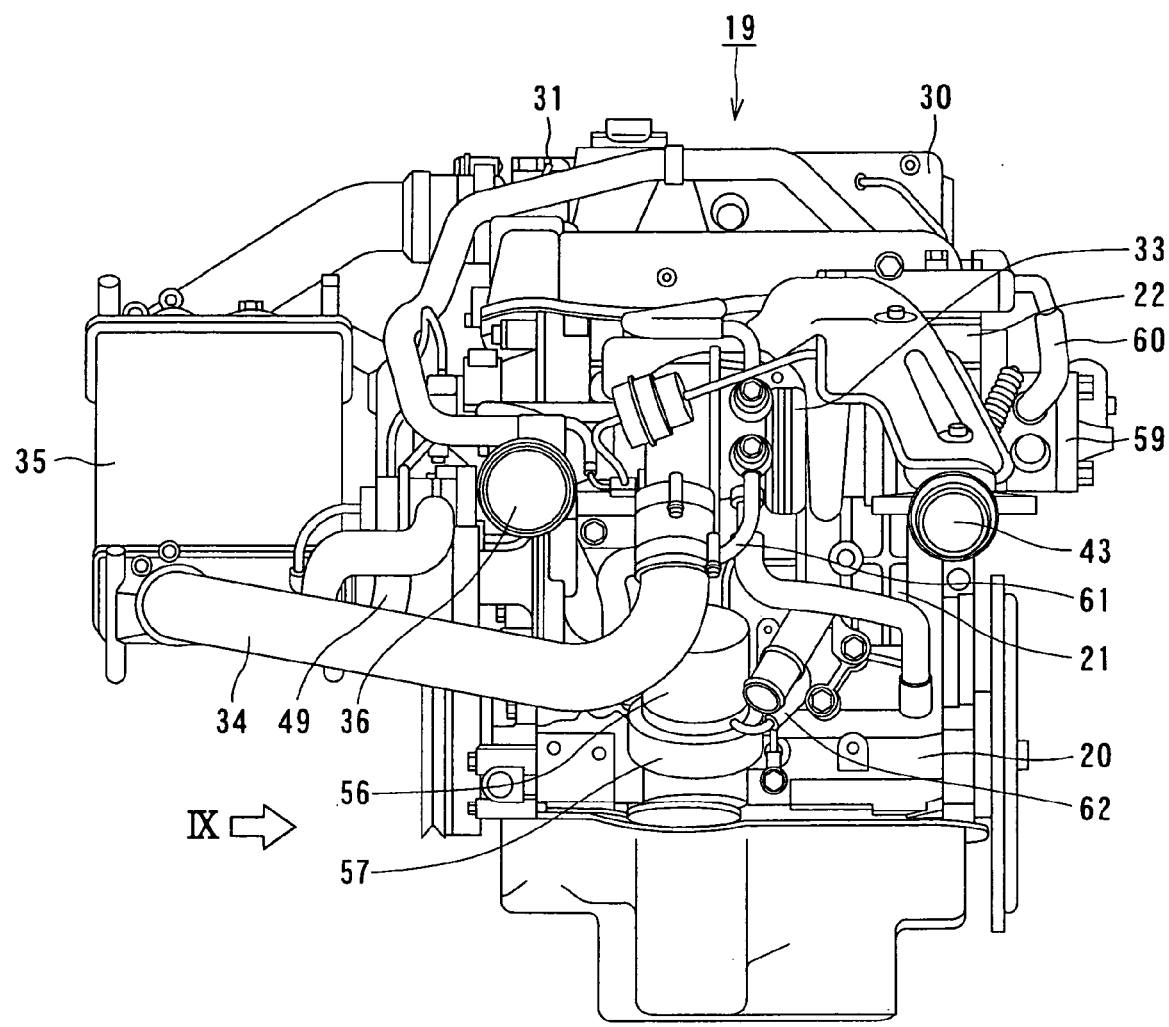
FIG. 8 is a front view of the engine of FIG. 7.
Figure 9:
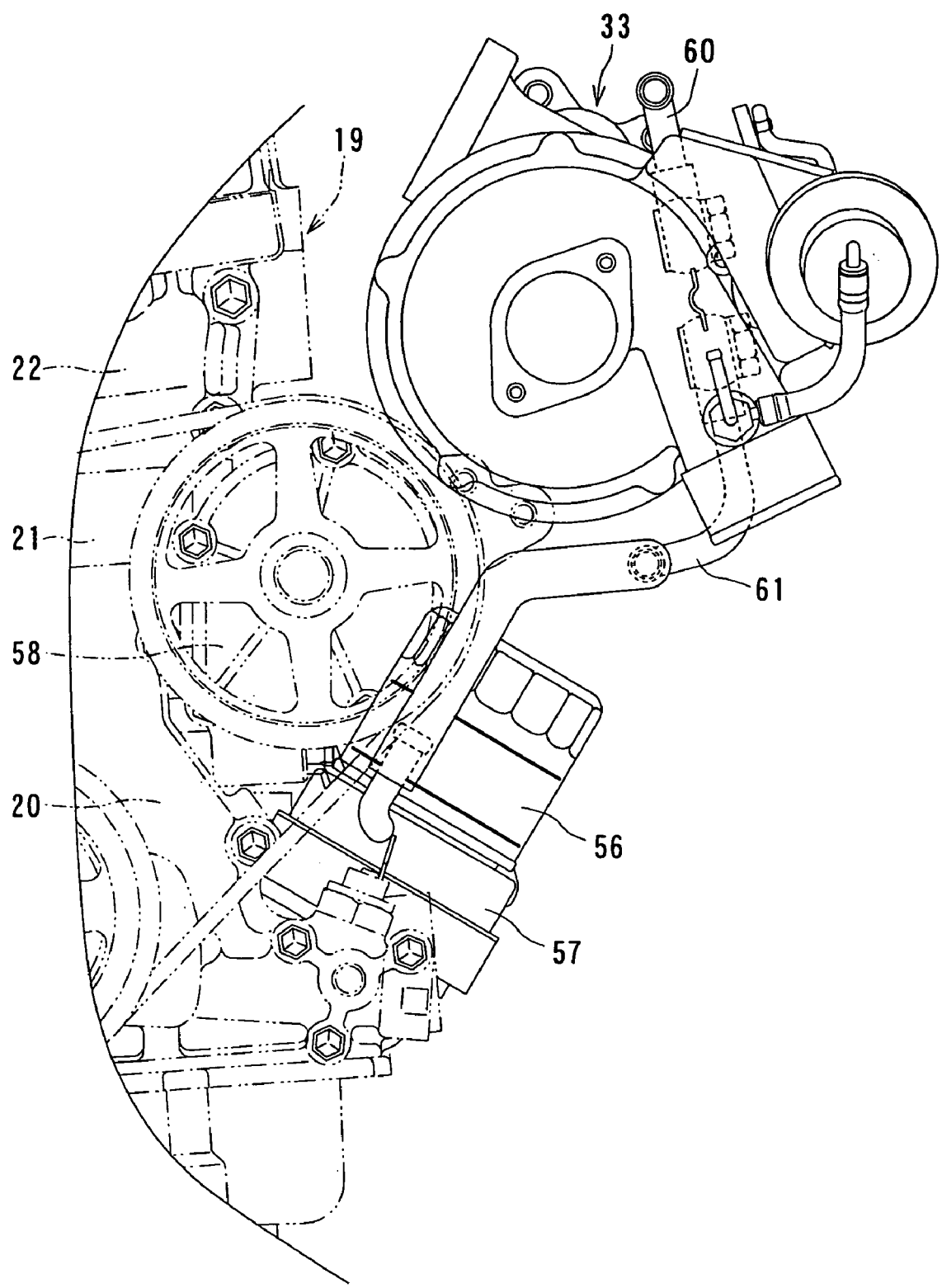
FIG. 9 is a right side view as seen in a direction of an arrow IX for showing an exploded portion of the front lower portion of the engine shown in FIG. 8.

With reference to FIGS. 8 and 9, an oil filter 56 for filtering lubricating oil of the engine 19 is arranged at the lower front portion of the engine 19 and below the turbo-charger 33. The oil filter 56 is arranged to be detachable in the upward direction as well as in a forward tilting state. A water-cooling oil cooler 57 is arranged to an affixing base of the oil filter 56 in series of the oil filter 56 for cooling the lubricating oil.

The engine 19 of the snowmobile of the described embodiment is a water-cooled engine having an engine cooling system, and in the engine cooling system, cooling water pressurized by a water pump 58 arranged on the right front side of the engine 19 (see FIG. 9) is introduced into a cooling-water jacket, not shown, provided in the engine 19 so as to cool various parts of the engine 19. The cooling water is then drained from the engine 19 through a cooling-water outlet, not shown, formed to the left side surface of the cylinder head 22.

The cooling-water outlet is provided with a thermostat 59 so that the cooling water is not drained until the cooling water reaches a predetermined temperature, thus preventing the cooling water from circulating in the cooling water jacket.

A first cooling-water tube 60 is disposed so as to extend towards the turbo charger 33 from the upstream side of the thermostat 59, and the cooling water drained from the upstream side of the thermostat 59 is then introduced to the turbo-charger 33 to thereby cool the turbo-charger 33.

Further, a second cooling-water tube 61 extends from the turbo-charger 33 towards the oil cooler 57, and the cooling water after cooing the turbo-charger 33 is introduced in the oil cooler 57 so as to cool the lubricating oil.

Furthermore, although not shown in detail, a third cooling-water tube 62 is provided for the oil cooler 57 to return to the upstream side of the water pump 58. On the other hand, a cooling-water tube, not shown, extends from the downstream side of the thermostat 59 towards the radiator 47 so as to cool the cooling water and then return again to the engine 19.

The engine of the snowmobile of the structure mentioned above will operate in the following manner.

When the snowmobile 1 travels forward, air-streams of the fresh air produced by the traveling of the snowmobile are introduced into the engine room 18 through the fresh-air inlets 39 formed to the engine hood 17 as shown by arrows in FIG. 5. A part of the fresh air introduced into the engine room 18 is then led into the air box 38 through the duct 41, pressurized, i.e., super-charged, by being introduced to the turbo-charger 33 via the air-inlet tube 37, and then, led into the engine 19 via the intake path 34 and the throttle body 31.

Furthermore, a part of the fresh air introduced into the engine room 18 is led to the inter-cooler 35 via the duct 42 to cool the intake air heated by the turbo-charger 33, and then, exhausted outside from the outlets 40 formed to the rear portion of the engine room 18 after cooling the battery 46, for example.

Furthermore, the residual fresh air introduced into the engine room 18 passes around the engine 19 and its auxiliary equipments so as to cool them and is then exhausted outside from the outlets 40 formed to the rear portion of the engine room 18.

The engine 19 is arranged in a state inclined slightly rearward downward so that the cylinder head 22 of the engine 19 is disposed at the front lower end of the wind-shield 15, which is arranged in front of the meter panel 14 in the side view, i.e., below the headlight 16 disposed in upper rear of the engine hood 17. The turbo-charger 33 is arranged at lower front portion of the cylinder head 22, and the engine 19 is further arranged so as to be offset in one direction in the plan view. The inter-cooler 35 is arranged on the side opposite to the engine offset side, thereby enabling the entire structure to be compact, even the four-stroke-cycle engine 19 having a large overall height, so as to be mounted in the engine room 18 formed below the engine hood 17 having a shape inclined forward downward with the highest position being disposed at the lowermost position of the headlight 16.

Furthermore, by arranging the air box 38 in front of the turbo charger 33 and the front suspension 3 for introducing fresh air, the fresh air introduced through the fresh-air inlets 39 is not thermally affected by the engine 19 itself, as well as various instruments or equipments arranged in the engine 19, such as the muffler 45. Moreover, the intake air can be prevented from being heated, thus improving the power of the engine 19 by increasing the charging efficiency.

Furthermore, the air box 38 is arranged in front of the turbo-charger 33 and the front suspension mechanism 3 so as to form a space between the meter panel 14 at rear portion of the cylinder head 22 and the headlight 16. The intake manifold 30 constituting an engine air intake system may be arranged in this space. As a result, the entire structure of the engine 19 can be made compact, thus enabling it to be mounted within the engine room 18 under the engine hood 17 having a shape inclined forward downward. The intake air is hardly thermally affected by various instruments in the engine 19.

In addition, the ECM box 32, for example, in which electronic equipments for control the engine operation are accommodated, is arranged behind the intake manifold 30a, so that such equipment, which may be deteriorated by the heat of the engine inside equipment, are protected from the heat. Moreover, the ECM is positioned at the uppermost position in the engine room 18, so that its maintenance can be far improved in comparison with the conventional arrangement in which the ECM is arranged in adjacent to the buttery 46. Still furthermore, the harness between the electronic equipments inside the ECM box 32 and those around the engine 19 can be shortened with the improved arrangement.

Further, the arrangement of the battery 46 behind the inter-cooler 35 makes it possible to cool the battery by the outside air cooling the inter-cooler 35, thus preventing the battery from deteriorating in its function.

Still furthermore, by arranging the muffler 45 below the inter-cooler 35, a space below the inter-cooler 35 can be effectively used, thus also making compact the entire engine 19. Moreover, since the turbo-charger 33 and the muffler 45, which are heat sources, are separated from each other, a temperature of a part of ambient air in the engine room 18 can be prevented from largely increasing.

In the structure that the inter-cooler 35 is attached to the vehicle body as in the conventional structure, by the twisting and bending of the vehicle body, a large load is applied to the connection part between the engine 19 and the intercooler 35. However, as in the present invention, by attaching the inter-cooler 35 to the boss 48 formed on the engine 19 with the mount bracket 49 therebetween, the deformation of the vehicle body does not affect the connecting portion to the engine 19 with the piping arrangement between the engine 19 and the inter-cooler 35 being also made compact.

Moreover, the engine vibration to the inter-cooler 35 will be hardly transmitted by interposing the cushion members 54 at the time when the intercooler 35 is attached to the mount bracket 49. Furthermore, by attaching the inter-cooler 35 in a state obliquely inclined forward downward, the height of the intercooler 35 can be suppressed from increasing, this also making compact the entire engine structure.

Furthermore, at the front and rear ends of the mount bracket 49, the bolts 52 for fixing the intercooler 35 are arranged substantially vertically so as to extend towards the top portion so that the inter-cooler 35 is attached from the upper side to thereby improve the maintenance efficiency such as detachability of such equipment.

On the other hand, the oil filter 56 is arranged, in order to be upwardly detachable, at the lower front portion of the engine 19 and below the turbo-charger 33 for filtering the lubricating oil of the engine 19. The oil filter 56 is arranged also in a state inclined forward so as to make compact the entire structure of the engine 19, thus further improving the maintenance efficiency such as detachability.

Still furthermore, the water-cooling oil cooler 57 is arranged for the affixing base of the oil filter 56 in series of the oil filter 56 for cooling the lubricating oil, and the cooling water after cooling the turbo-charger 33 is introduced to the oil cooler 57 so as to cool the lubricating oil, thereby shortening the length of the cooling pipe and improving the maintenance efficiency and the performance for cooling the lubricating oil.

It is to be noted that the present invention is not limited to the described embodiment and many other changes and modifications may be made without departing from the scopes of the appended claims.

What is claimed is:

1. An engine structure of a snowmobile, in which an upper front half of a vehicle body of the snowmobile is covered to be openable by an engine hood so as to form an engine room in which an engine is disposed and the engine has a turbo-charger mounted thereon, wherein a headlight is disposed above a rear portion of the engine hood, and the engine is arranged in a state inclined rearwardly downward so that a cylinder head of the engine is disposed below the headlight in a side view and the turbo-charger is arranged below the cylinder head and wherein said engine is arranged so as to be offset in one direction in a plan view and an inter-cooler is disposed on a side opposite to the side on which the engine is offset.

2. An engine structure of a snowmobile according to claim 1, wherein said inter-cooler is attached to a mount bracket, with a cushion being interposed therebetween, in a state inclined forward downward, and the mount bracket is attached to a boss attached to the engine.

3. An engine structure of a snowmobile according to claim 2, wherein said inter-cooler is mounted to the mount bracket through bolts disposed to the mount bracket substantially perpendicularly in an upward direction.

4. An engine structure of a snowmobile according to claim 1, wherein an oil filter for filtering lubricating oil of the engine detachably disposed at a front lower portion of the engine and below the turbo-charger in a forward tilting state.

5. An engine structure of a snowmobile according to claim 4, wherein a water-cooling oil cooler for cooling the lubricating oil is disposed to an affixing base of the oil filter in series of the oil filter.

6. An engine structure of a snowmobile according to claim 5, wherein a cooling water passage for cooling the turbo-charger and a cooling water passage of the oil cooler are communicated with each other through a cooling water tube.

7. An engine structure of a snowmobile according to claim 1, wherein a skid for steering operation is disposed in a front lower portion of the vehicle body so as to be supported by a front suspension mechanism in a shock-absorbable manner, and an air box for introducing outside air is arranged in front of the turbo-charger and the suspension mechanism.

8. An engine structure of a snowmobile according to claim 1, wherein a meter panel is further disposed behind the headlight and an intake manifold is arranged behind the cylinder head and in a space between the meter panel and the headlight.

9. An engine structure of a snowmobile according to claim 8, wherein an equipment box, in which electronic equipments for controlling engine operation are disposed, is arranged at a rear portion of the intake manifold.

10. An engine structure of a snowmobile according to claim 1, wherein the turbo-charger is provided with an exhaust port from which an exhaust pipe extends and a muffler is connected to a downstream side end of the exhaust pipe so as to be located below the inter-cooler.

11. An engine structure of a snowmobile according to claim 1, wherein a battery is disposed behind the inner-cooler.

12. An engine structure of a snowmobile in which an upper front half of a vehicle body of the snowmobile is covered by an engine hood in a manner so as to be opened and form an engine room in which an engine is disposed and which has a turbo-charger mounted thereon, wherein the engine is arranged so as to be offset in one direction in a plan view and an inter-cooler is disposed on a side opposite a side on which the engine is offset.

* * * * *